United States Patent
Gokhale et al.

(10) Patent No.: US 11,715,952 B2
(45) Date of Patent: Aug. 1, 2023

(54) SYSTEM AND METHOD OF MANAGING ENERGY DISTRIBUTION USING A DISTRIBUTED LEDGER

(71) Applicant: Eaton Intelligent Power Limited, Dublin (IE)

(72) Inventors: Manoj Gokhale, Magarpatta (IN); Ramanath Iyer Ramakrishnan, Westlake, OH (US); David K. Yee, West Bloomfield, MI (US); Shailendra Fuloria, Pune (IN); Santosh Kumar Sharma, Maharashtra (IN)

(73) Assignee: Eaton Intelligent Power Limited, Dublin (IE)

( * ) Notice: Subject to any disclaimer, the term of this patent is extended or adjusted under 35 U.S.C. 154(b) by 129 days.

(21) Appl. No.: 15/733,384

(22) PCT Filed: Jan. 17, 2019

(86) PCT No.: PCT/EP2019/025017
§ 371 (c)(1),
(2) Date: Jul. 17, 2020

(87) PCT Pub. No.: WO2019/141511
PCT Pub. Date: Jul. 25, 2019

(65) Prior Publication Data
US 2021/0098988 A1   Apr. 1, 2021

Related U.S. Application Data

(60) Provisional application No. 62/677,393, filed on May 29, 2018, provisional application No. 62/618,978, filed on Jan. 18, 2018.

(51) Int. Cl.
*H02J 3/00* (2006.01)
*G06Q 50/06* (2012.01)
*H02J 3/38* (2006.01)

(52) U.S. Cl.
CPC .............. *H02J 3/008* (2013.01); *G06Q 50/06* (2013.01); *H02J 3/381* (2013.01); *H02J 2203/20* (2020.01)

(58) Field of Classification Search
CPC ........ H02J 3/008; H02J 3/381; H02J 2203/20; G06Q 50/06; G06Q 10/063; Y02E 60/00; Y04S 50/10; Y04S 40/20
See application file for complete search history.

(56) References Cited

U.S. PATENT DOCUMENTS

| | | | |
|---|---|---|---|
| 11,238,546 B2* | 2/2022 | Winand | G06Q 40/04 |
| 2008/0172312 A1* | 7/2008 | Synesiou | H02J 13/00034 |
| | | | 705/40 |

(Continued)

FOREIGN PATENT DOCUMENTS

| | | |
|---|---|---|
| CN | 106875164 A | 6/2017 |
| CN | 107240002 A | 10/2017 |

(Continued)

OTHER PUBLICATIONS

Harri Maki-Mantila, European International Searching Authority, International Search Report and Written Opinion, counterpart PCT Application No. PCT/EP2019/025017, dated Mar. 15, 2019, 14 pages total.

*Primary Examiner* — Ziaul Karim
(74) *Attorney, Agent, or Firm* — DiBerardino McGovern IP Group LLC

(57) ABSTRACT

An electricity distribution system includes a peer-to-peer decentralized ledger network and a plurality of distributed ledger nodes in communication within the peer-to-peer decentralized ledger network. At least one distributed ledger node of the plurality of distributed ledger nodes includes a processor that aids in executing peer-to-peer energy and financial transactions between energy suppliers and energy buyers. The processor is programmed to schedule at least (Continued)

one of supply of electricity from one of a plurality of available energy sources to an on-site load based on predetermined demand parameters set by an energy buyer and delivery of electricity generated by a distributed energy resource to an external load based on predetermined supply parameters set by an energy supplier.

40 Claims, 6 Drawing Sheets

(56) References Cited

U.S. PATENT DOCUMENTS

| | | |
|---|---|---|
| 2016/0284033 A1 | 9/2016 | Winand et al. |
| 2017/0103468 A1 | 4/2017 | Orsini et al. |
| 2017/0358041 A1* | 12/2017 | Forbes, Jr. ............. G05D 17/00 |
| 2019/0098067 A1* | 3/2019 | Sandoval .......... H02J 13/00024 |

FOREIGN PATENT DOCUMENTS

| | | |
|---|---|---|
| GB | 2531828 A | 5/2016 |
| WO | 2017004681 A1 | 1/2017 |
| WO | 2017092788 A1 | 6/2017 |
| WO | 2017199053 A1 | 11/2017 |

* cited by examiner

SYSTEM AND METHOD OF MANAGING ENERGY DISTRIBUTION USING A DISTRIBUTED LEDGER

BACKGROUND

Embodiments of the present invention relate generally to electricity/energy distribution and, more particularly, to a system and method for managing the distribution of electricity/energy supplied by utilities and other energy producers via distributed ledger technology.

Recent cost reductions and continued tax credits in renewable energy such as solar photovoltaic (PV) and wind energy has resulted in the growth of residential and commercial scale renewable energy installed capacity. With the continued development in battery technologies, a similar growth in residential and commercial scale battery storage installed capacity is anticipated.

Collectively, the aforementioned solar, wind, and battery storage energy sources represent Distributed Energy Resources (DERs). As the installed capacity of DERs grows, several problems are envisioned. Currently, any excess renewable energy generated is sold to the local centralized retailer (aka utility) via net metering, a program that allows an energy consumer to offset the cost of electricity drawn from the utility based on how much renewable energy they feed into the utility's grid. Net metering is not favored by the utilities since this results in a negative impact on the utility's power revenues. So, as the DER capacity increases, the utility's revenues will likely decrease. More renewable DERs means adding more electricity to the grid which can lead to power quality and grid stability issues.

To limit the utility's revenue losses and help address power quality and grid stability concerns, revisions to net metering regulations are occurring in some states. For example, the new regulations allow the utility to pay wholesale prices for the renewable energy fed to the utility grid when the residential or commercial owner of the DERs asset becomes a net supplier of electricity. Fortunately, the utility will continue to pay retail price for the renewable energy fed to the utility grid so long as the owner of the DERs asset remains a net consumer of electricity.

Administrative costs also impact a utility's revenues. For example, a utility incurs costs in managing the billing of electricity consumers and must account for the risk of bad debt from any unpaid bills. In addition, a utility must read and maintain the meters of consumers, which may require travelling to a consumer's property. Each of these administrative activities increase the overhead cost of a utility's operation, adding up to approximately 50% of the price of electricity to the consumers.

The current structure of the electricity distribution system also poses certain limitations on the owners/operators of DERs and electricity consumers. Owners/operators of DERs only have one outlet (local centralized utility) to sell their excess power and at a price set by the utility. Also, owners of DERs do not have access to the real time electricity pricing market where prices are high when demand is high. Consumers face a similar scenario, with a single source for the purchase of electricity and a fixed pricing structure for that purchase.

Therefore, it would be desirable to provide a system and method for managing the distribution of electricity that addresses the aforementioned drawbacks.

BRIEF DESCRIPTION OF THE INVENTION

Embodiments of the present invention provide a system and method for managing the distribution of energy using a decentralized, distributed ledger network that enables secure peer-to-peer energy transactions, allows consumers and prosumers to set their energy buying and selling preferences, and facilitates a reduction in the overhead cost of producing and distributing electricity via Smart Contracts.

In accordance with one aspect of the invention, an electricity distribution system includes a peer-to-peer decentralized ledger network and a plurality of distributed ledger nodes in communication within the peer-to-peer decentralized ledger network. At least one distributed ledger node of the plurality of distributed ledger nodes includes a processor. The processor is programmed to schedule at least one of supply of electricity from one of a plurality of available energy sources to an on-site load based on predetermined demand parameters and delivery of electricity generated by a distributed energy resource (DER) to an external load based on predetermined supply parameters.

In accordance with another aspect of the invention, a non-transitory, computer readable storage medium has stored thereon a computer program for managing the distribution of electricity. The computer program includes instructions that cause a processor to negotiate and execute at least one Smart Contract based on preferences for at least one of electricity consumption and electricity transmission for at least one distributed ledger node of a distributed ledger network and generate at least one of an electricity consumption schedule and an electricity transmission schedule for the at least one distributed ledger node according to the preferences. The instructions further cause the processor to instruct a device associated with at least one distributed ledger node to permit electricity to flow therethrough according to the generated schedule and register each electricity consumption and transmission transaction associated with the at least one distributed ledger node on the distributed ledger network.

In accordance with yet another aspect of the invention, a non-transitory, computer readable storage medium has stored thereon a computer program for controlling energy distribution. The computer program includes instructions that cause a controller to access a Smart Contract including a number of predefined preferences for at least one of energy consumption and energy transmission through a node in a peer-to-peer network. The instructions also cause the controller to execute the Smart Contract by controlling a relay on a circuit breaker to selectively switch between an ON state that permits energy to flow therethrough and an OFF state that prevents energy from flowing therethrough and record each energy transaction executed at the node according to the Smart Contract with a distributed ledger on the peer-to-peer network.

In accordance with still another aspect of the invention, an energy distribution system includes a peer-to-peer distributed ledger network and a plurality of distributed ledger nodes in communication with the peer-to-peer distributed ledger network. A first distributed ledger node of the plurality of distributed ledger nodes includes a distributed energy resource (DER); a smart meter monitoring an amount of energy produced by the DER; and a processor programmed to issue at least one certificate to an owner of the DER based on the monitored amount of renewable energy produced by the DER.

In accordance with yet another aspect of the invention, a non-transitory, computer readable storage medium has stored thereon a computer program for controlling energy distribution. The computer program includes instructions that cause a controller to access a Smart Contract including a number of predefined preferences for at least one of energy consumption and energy transmission through a node in a peer-to-peer network. In addition, the instructions cause the controller to execute the Smart Contract to selectively permit or prevent a transfer of energy and record each energy transaction executed at the node according to the Smart Contract with a distributed ledger on the peer-to-peer network.

Various other features and advantages of the present invention will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Embodiments of the invention are directed to a system and method of managing the distribution of electricity generated by utilities, prosumers, and prosumagers using a distributed ledger network such as, for example, Blockchain. As used herein, the term prosumer refers to a residential, commercial, or industrial entity that is a consumer of electricity and a producer of electricity by way of a renewable source such as, for example, solar, wind, hydro-electric, geothermal, or compressed air. The term prosumager used herein refers to a prosumer that stores at least a portion of the electricity produced by the renewable source(s) in an energy storage system such as, for example, a battery storage system including at least one battery or an alternative energy storage means that is readily dispatchable such as, for example, a compressed air energy storage system. The distributed ledger network is a decentralized, peer-to-peer network and securely tracks all transactions between electricity suppliers, consumers, prosumers, and prosumagers. As described in detail below, the transactions are recorded on a distributed ledger, executed using Smart Contracts and electricity usage data is metered by smart devices, such as, for example, a smart meter or smart circuit breakers including Energy Management Circuit Breakers (EMCBs), Energy Management Main Breakers (EMMBs), and optional Electric Vehicle Breakers or Electric Vehicle Circuit Breakers (EVCBs). The distributed ledger network enables an electrical energy consumer to select from available energy sources at any given time. Similarly, the energy supplier (e.g., a prosumer, prosumager, power producer, transmitter, distributor, retailer, or, generically, a utility) can provide terms and conditions for selling energy. The system includes a user interface that has access to the distributed ledger network and allows consumers, prosumers, and prosumagers to manage the purchase and sale of electricity based on certain user-defined preferences or parameters, including, for example, urgency, tariff (i.e., price), reliability/resiliency of the supplier, or the green content of energy (i.e., the proportion of energy that is produced via renewable resources).

Figure 1:
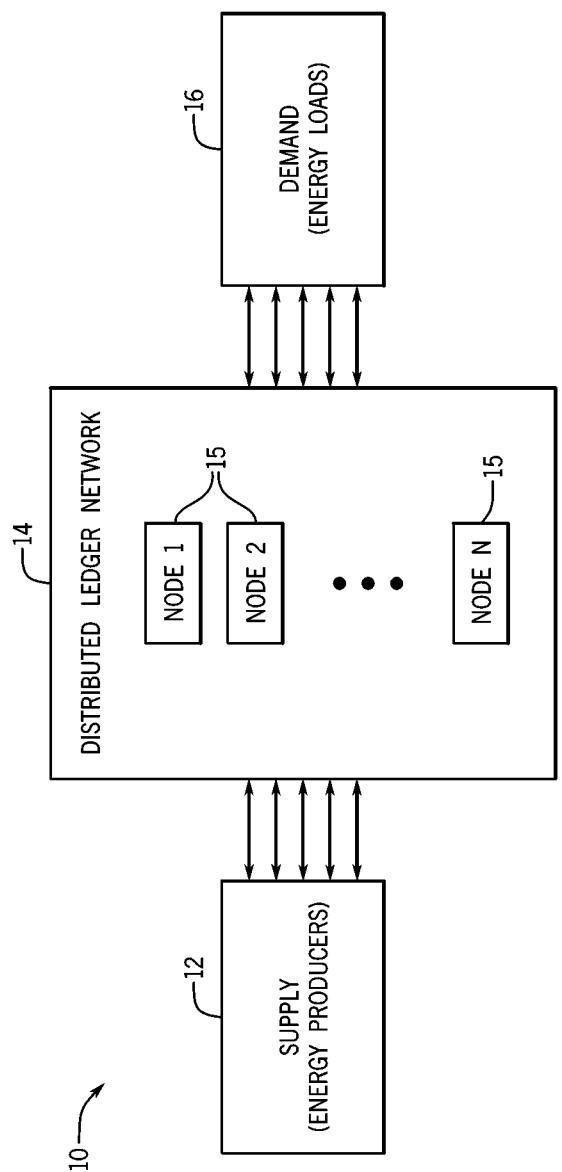
FIG. 1 is a schematic diagram of a peer-to-peer distributed ledger-electron transaction model, according to an embodiment of the invention.

Referring to FIG. 1, a distributed ledger-electron transaction model 10 is shown, according to an embodiment of the invention. Model 10 illustrates interactions between energy producers or suppliers 12, a decentralized, distributed ledger network 14 having a plurality of distributed ledger nodes 15, and consumer energy loads 16. Energy suppliers 12 include traditional suppliers of electricity, such as, for example, utilities that supply energy using fossil fuels, and more contemporary energy producers like prosumers and prosumagers that supply energy using DERs such as, for example, wind, solar PV, hydroelectric, and battery storage systems. Consumer loads 16 include any specific residential, commercial, or industrial load such as, for example, the electric dryer or water heater in a residence, the air conditioner in a commercial building, and heavy-duty pumps in an industrial building. Under various circumstances, non-traditional energy suppliers 12 (e.g., prosumers, prosumagers, etc.) that include energy sources and loads may be considered loads 16 in addition to or instead of energy suppliers 12.

Distributed ledger network 14 is a peer-to-peer network that enables/permits peer-to-peer electron transactions of low and medium voltage energy between network nodes in the absence of a central retail authority, aggregator, or third-party intermediary. In one non-limiting embodiment, distributed ledger network 14 is an internet connected blockchain network. Each energy supplier and consumer site that is part of distributed ledger network 14 has at least one node 15 associated therewith, with the number of nodes 15 determined based on how the supplier or consumer power sources and loads are metered and connected. A utility may have a plurality of site-level nodes 15 corresponding to its generating plants and substations and may also have nodes 15 defined at the device or component level such as, for example, at a transformer or a meter. A consumer site may have one or more nodes 15 registered with distributed ledger network 14. As a non-limiting example, a consumer may have just one node 15 for the entire property (e.g., a residential home). However, a consumer site may also have multiple nodes 15 corresponding to different buildings at a site (e.g., separate building structures within a commercial complex), different units within a given building (e.g., rental units within an apartment building), and/or individual loads within the same building structure such as, for example, a heating, ventilation, and air conditioning (HVAC) system and an electric dryer. Prosumers and prosumagers may have separately defined nodes 15 for power supplies (e.g., PV panels, batteries) and individual loads.

Distributed ledger network 14 allows consumers to make energy and financial exchanges directly with all energy suppliers, not just utilities. For example, a consumer may execute a transaction or exchange directly with a prosumer without a utility as an intermediary or middleman in the transaction. The energy and financial exchanges are executed through enhanced intelligence software code, referred to hereafter as Smart Contracts, running in conjunction with the distributed ledger network 14. Smart Contracts digitally facilitate, execute and/or enforce the performance of a contract between the energy suppliers and consumers in a secure, trackable, and irreversible manner Each Smart Contract includes instructions that effect the energy transfer as well as instructions that initiate a financial transaction associated with the purchase and sale. The financial transaction may be carried out using any of known online method such as, for example, E-wallets, VISA, Netbanking, cryptocurrencies, tokens, and the like.

Every formation or modification of a Smart Contract is securely recorded in distributed ledger network 14 as a separate electron transaction using cryptography and shared with all nodes 15 in distributed ledger network 14 or a select subset of those nodes 15. Since each electron transaction record is shared among multiple nodes 15, any attempt to improperly change a record by a single party is exceedingly difficult, as all the distributed copies of the record within network 14 would also need to be changed. Further, each record may also have a relationship with preceding and subsequent records, so those records would have to be changed as well. As such, the structure of digital ledger network 14 is inherently resistant to cyberattacks.

The purchase and sale of energy within the distributed ledger network 14 is carried out based on a variety of information communicated between energy suppliers 12 and loads 16 via distributed ledger network 14. Energy suppliers 12 actively or passively transmit information regarding the time-of-availability, pricing (tariffs), and type of energy in real time to distributed ledger network 14. An enhanced intelligence software algorithm matches a particular energy supplier 12 to a consumer to power their loads 16 when the consumers' user-defined preferences or parameters align with information provided by supplier 12. In other words, the energy transactions and associated financial transactions are executed on a peer-to-peer level based on the match of requirements or preferences at consumer and producer/supplier ends, while distributed ledger network 14 virtually connects all nodes 15 and maintains energy transaction data and financial transaction data.

The data provided by energy suppliers or sellers 12 and by their consumers or buyers may be stored in a variety of locations such as, for example, in cloud storage associated with distributed ledger network 14 and at supplier/consumer sites on devices connected to distributed ledger network 14. When energy supplier and energy consumer requirements or preferences match (i.e., the conditions in the Smart Contract are met), the distributed ledger network 14 self-executes the energy and financial transactions associated with the Smart Contract to supply energy to consumer loads 16. The Smart Contract would essentially act as an escrow. As a non-limiting example, when a consumer wants to buy energy the consumer submits a request to the marketplace. This commitment to buy sends the consumer's funds to an escrow contract. When a match is made in the marketplace between an energy supplier and the consumer, that match is recorded in the contract. Finally, when the energy seller's smart meter verifies that they've sent the right style and quality of energy to the grid, then the funds are released to them.

Figure 2:
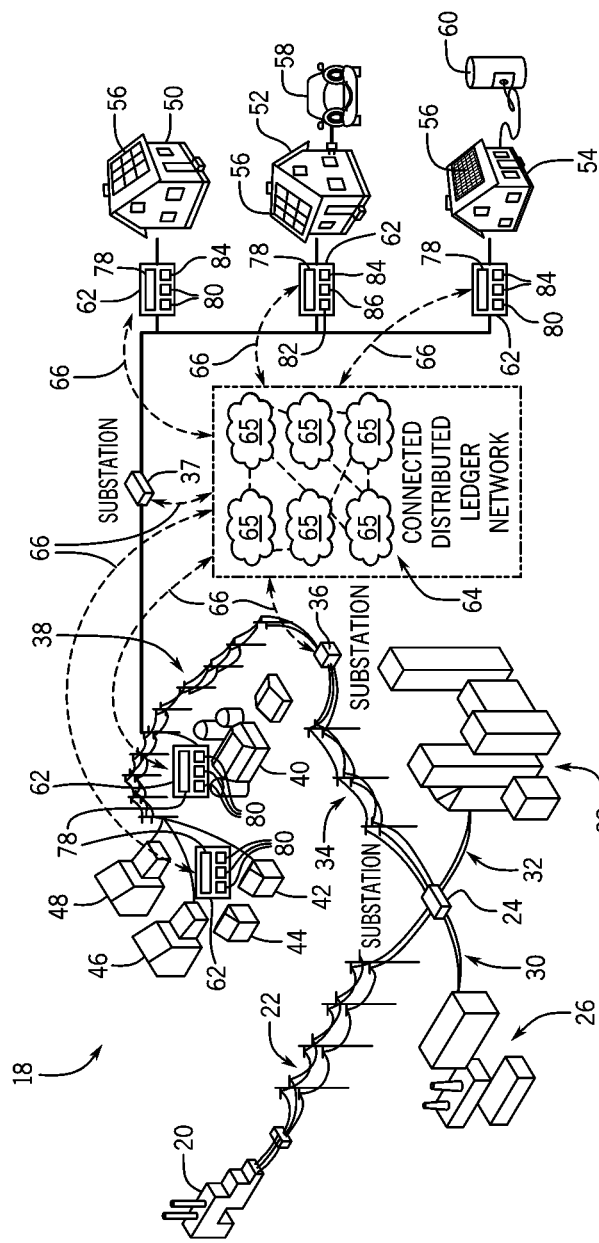
FIG. 2 is a schematic diagram of a transmission and distribution grid, according to an embodiment of the invention.

Referring now to FIG. 2, an energy transmission and distribution grid 18 incorporating distributed ledger technology is shown, according to an embodiment of the invention. Grid 18 includes a traditional power generating facility 20 such as, for example, a utility-owned facility that generates electricity using fossil fuels. Distribution or transmission lines 22 couple facility 20 to a substation 24, which directs electricity from facility 20 to various industrial properties 26 and commercial properties 28 via distribution or transmission lines 30, 32, respectively. Distribution or transmission lines 34 couple substation 24 to another substation 36, which directs electricity along distribution or transmission lines 38 to a commercial property 40 and a variety of residential properties 40-48, which are depicted as traditional consumer sites. Grid 18 includes another substation 37 that is connected to additional residential properties 50-54, which are depicted as prosumer sites that consume electricity generated by facility 20 and also produce electricity via PV panels 56. Prosumer site 52 also includes an electric vehicle 58. Prosumer site 54 includes battery storage 60 and thus may also be referred to as a prosumager site. Each property 40, 44, 50-54 includes a circuit panel 62 having an EMMB 78 and at least one EMCB 80, 82, 84 (shown in FIG. 3). Circuit panel 62 of prosumer property 52 also includes an EVCB 86.

The physical electrical connections between circuit panels 62 and distribution lines 38 are made in a traditional manner. However, since circuit panels 62 include smart circuit breakers in the form of EMMBs 78, EMCBs 80, 82, 84, and EVCBs 86, circuit panels 62 are also enabled to be in communication with a plurality of access points 65 of a distributed ledger network 64 via wireless connections 66. Distributed ledger 64 is also in wireless communication with substations 36, 37 so as to receive information about the electricity flowing therethrough such as, for example, availability, price, and amount produced by renewable energy sources. An Independent System Operator (ISO) or equivalent authority can also use the substation connections to monitor power quality and grid stability.

At least one distributed ledger node may be established at each property or site in communication with distributed ledger network 64, and each distributed ledger node is associated with an access point 65 of distributed ledger network 64. As a non-limiting example, distributed ledger 64 may include an access point 65 for each distributed ledger node. As another non-limiting example, multiple distributed ledger nodes at the same site may be associated with the same access point 65. However, regardless of how each access point 65 is associated with the distributed ledger nodes, each access point 65 includes an identical copy of the information recorded in distributed ledger 64 and is updated upon completion of each transaction in distributed ledger 64.

A distributed ledger node may be established at substations 36, 37 and at the EMMB 78 of each circuit panel 62. A distributed ledger node may also be established at each EMCB 80, 82, 84 and EVCB 86 of circuit panels 62 or at one or a select subset of those smart circuit breakers. In alternative embodiments, distributed ledger nodes may be established at the EMCBs 80, 82, 84 and EVCBs 86 of circuit panels 62, but not the EMMBs 78. In yet another alternative embodiment, a single distributed ledger node may be established for multiple properties, while the properties retain their individual identity and energy and financial accounting. As a non-limiting example, one distributed ledger node may be established for properties 40, 44 and another distributed ledger node may be established for properties 50-54, with each property 40, 44, and 50-54 still retaining its individuality via EMMBs 78 of respective circuit panels 62.

Distributed ledger nodes may also be established at facility 20, substation 24, and commercial and industrial sites 26, 28 and, in particular, at the circuit panels and at any smart circuit breakers included therein (not shown). In some embodiments, the utility's power revenue will be partially supplemented with an energy transaction fee for the use of the utility's distribution network (physical wires). For example, a utility may get paid fixed price per kilowatt-hour (kW-hr) transacted or a percentage of the tariff paid peer-to-peer. This can be automatically transacted and tracked via Smart Contracts and the distributed ledger network 64.

All nodes of distributed ledger network 64 will know the energy availability, supply, and demand status of every other node. This will allow each consumer to choose the type of energy a) by green/renewable content, b) by cost/tariff, c) by urgency or scheduled need, and/or d) reliability/resiliency of the supplier. Hence, the disclosed system and method permits the transaction of energy to be more efficient, secure, and timely. Distributed ledger network 64, through its Smart Contracts, can schedule automated addition of energy from DERs into grid 18. Since these Smart Contracts are on distributed ledger network 64, grid operators (e.g., a utility) can anticipate future consumer demand and when energy will be added to grid 18 by prosumers or prosumagers, thereby improving grid stability and reducing the overall carbon emissions for the region by eliminating excess energy production from non-renewable sources. Also, based on the tariff or utility incentives designed to induce lower electricity use at times of high demand (e.g., reduced or discounted payment in exchange for load reduction in kilowatts (kWs) or megawatts (MWs)), the EMCBs 80, 82, 84 and EVCBs 86 of circuit panels 62 can utilize Demand Response or DR control techniques to control the larger loads like HVAC systems, enabling reduced costs for the consumer and lowering peak demand on the grid.

Distributed ledger network 64 monitors and executes energy or electricity transactions at each distributed ledger node. In other words, distributed ledger network 64 tracks each energy transaction involving energy transfer at properties 40, 44, and 50-54 using the EMMBs 78, EMCBs 80, 82, 84, and/or EVCBs 86 within circuit panels 62. As a non-limiting example, distributed ledger network 64 controls how much electricity is permitted to flow through the EMCBs 80, 82, 84 of circuit panels 62 to high load devices and controls the timing or schedule of the electricity supply according to consumer preferences and keeps track of all energy transactions. As another non-limiting example, distributed ledger network 64 controls when electricity may flow to electric vehicle 58 at prosumer site 52 by controlling the EVCB 86 of circuit panel 62 according to the preferences of the owner of prosumer site 52. As yet another non-limiting example, distributed ledger network 64 determines when to allow energy produced by PV panels 56 of prosumer sites 50-54 and/or energy stored in battery storage 60 of prosumer site 54 to flow to transmission lines 38, based on the parameters in the Smart Contracts for prosumer sites 50-54.

While all of the nodes within distributed ledger network 64 of FIG. 2 are coupled to generating facility 20, the general concept of distributed ledger network 64 may be extended for use in a completely isolated microgrid decoupled from generating facility 20 or any other traditional energy supplier or utility. As a non-limiting example, prosumer sites 50, 52 and prosumager site 54 produce their own power and may form an isolated microgrid that is not coupled to any utility. In such an embodiment, sites 50-54 would be decoupled from distribution lines 38 and would form their own distribution grid on a much smaller scale. The Smart Contracts on the distributed ledger nodes at sites 50-54 would enable a self-regulated microgrid management system through the EMMBs 78, EMCBs 80, 82, 84, and EVCBs 86 of circuit panels 62. This self-regulated microgrid management may perform tasks such as automatically triggering curtailment, redispatch, demand-side management, and production/storage from batteries, as non-limiting examples.

In another embodiment, distributed ledger network 64 can be a completely isolated microgrid or physically connected to high voltage grid 18 through a substation such as, for example, substation 37. It is through this physical connection to substation 37 that prime power producers (e.g., facility 20) can participate in supplying power to the distributed ledger nodes within the microgrid of network 64 (e.g., prosumers or prosumagers at sites 50-54). Additionally, substation 37 is the conduit whereby excess energy produced by the distributed ledger nodes within the microgrid of distributed ledger network 64 (e.g., prosumers or prosumagers at sites 50-54) can be transferred to the other distributed ledger nodes within distributed ledger network 64 (e.g., consumers at sites 40, 44). When excess energy is transferred out, the consumers or buyers of this energy can be the prime power producers of another distribution network or may be traditional consumers like the owners of residential properties 42-48. In some embodiments, substation 37 may include its own EMMB and/or EMCBs that can be controlled according to Smart Contracts on distributed ledger network 64 to selectively isolate the microgrid from the remainder of grid 18.

Existing energy transmission and distribution grids such as grid 18 can be retrofitted for use as a distributed ledger network by incorporating the smart circuit breaker components and monitoring devices described herein. New construction sites, such as new commercial, industrial, or residential developments, can also be easily incorporated into an existing distributed ledger network through a new substation connection to the existing grid 18. In instances where the new construction site includes prosumers, prosumagers, and/or other site specific renewable energy sources, such as solar arrays or wind farms, the new substation may be constructed as a lower cost, lower capacity structure than in a traditional grid structure since the new construction site has the capacity to produce a portion of its energy consumption and thus can operate as a partially isolated microgrid. In other words, the substation may include smaller components at a lower construction cost to the utility because the new construction site will produce some electricity internally. Thus, the demand on the new substation will not be as high as with a traditional neighborhood.

In one embodiment, distributed ledger network 64 is configured to track the production and sale of renewable energy using electronically-issued energy commodities such as Renewable Energy Certificates (RECs) or similar energy certificate. Distributed ledger network 64 may be configured to issue an energy certificate to a prosumer or prosumager when the prosumer/prosumager generates a particular quantity of renewable energy and transfer the energy certificate when the prosumer/prosumager executes a Smart Contract to transfer that energy to grid 18. In other words, a prosumer may produce an amount of renewable energy, obtain at least one certificate associated with that renewable energy, and sell/transfer the renewable energy and the certificate(s) associated with that renewable energy to an energy consumer. The energy certificates thus provide a mechanism for the purchase of renewable energy that is added to and pulled from the electrical grid. If one wishes to specifically purchase renewable energy, one can simply purchase an energy certificate, which inherently provides proof of purchase of green energy. Distributed ledger network 64 can track the energy certificates awarded to each DER owner and manage purchases of those energy certificates. Thus, distributed ledger network 64 operates with a system of overall checks and balances that ensures that no fraudulent transactions occur.

While RECs are typically awarded for 1 megawatt-hour (MW-hr) of energy production, distributed ledger network 64 may be configured to issue RECs to energy suppliers for a lower amount of energy produced in order to make it easier for typical energy consumers to purchase the renewable energy from DERs rather than a utility. As a non-limiting example, a consumer that wishes to purchase renewable energy may be more likely to purchase energy on a 1 kW-hr basis as opposed to a 1 MW-hr basis, so distributed ledger network 64 may issue energy certificates based on smaller energy increments such as, for example, on a 1 kW-hr basis. Alternatively, distributed ledger network 64 may issue fractions of certificates, such as, for example, one-tenth of a 1 kW-hr certificate (a 100 W certificate), so that consumers can purchase renewable energy on an even smaller scale if desired. As another non-limiting example, distributed ledger network 64 may be configured to track smaller units of energy production (e.g., 1 kW-hr and fractions thereof) and larger units of energy production (e.g., 1 MW-hr and fractions thereof) by DERs to enable residential, commercial, and industrial consumers to purchase renewable energy in differing units of scale.

Figure 3:
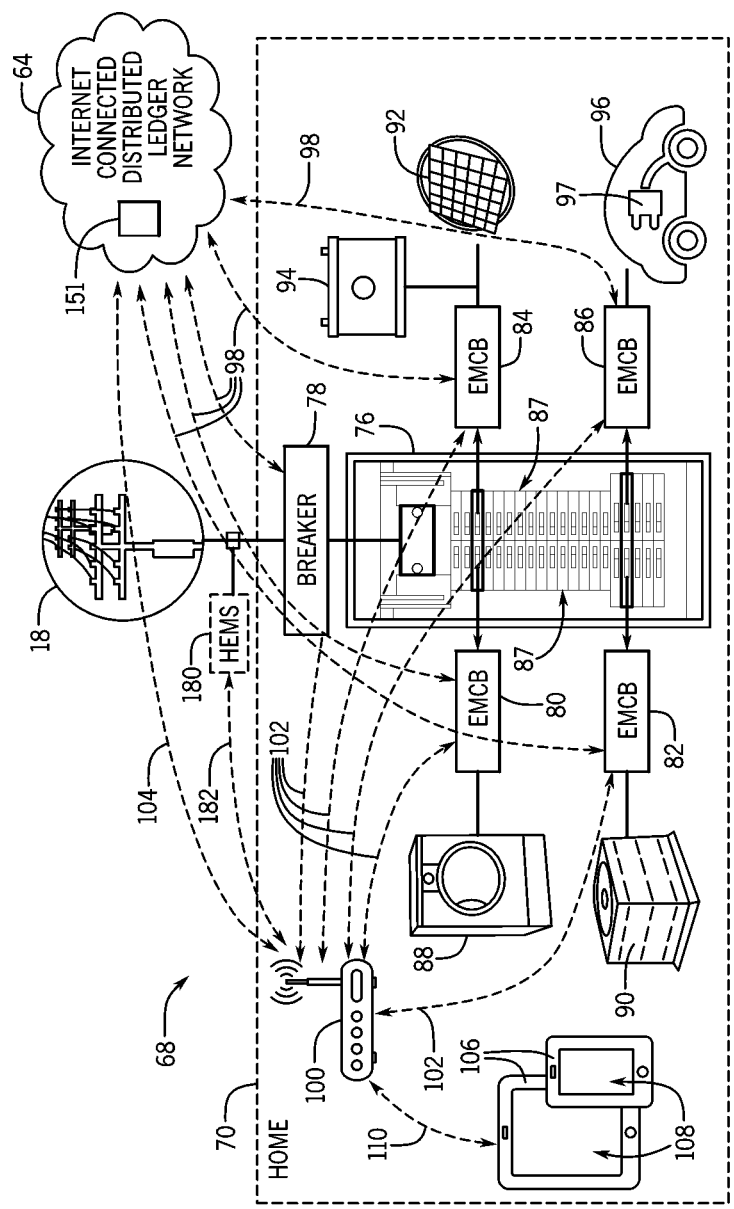
FIG. 3 is a schematic diagram of an exemplary prosumer site connected to the transmission and distribution grid and in wireless communication with the distributed ledger network of FIG. 2, according to an embodiment of the invention.

Referring now to FIG. 3, a schematic diagram of an exemplary prosumager's site 68 is shown, according to an embodiment of the invention. Prosumager site 68 includes a residence 70 that is connected to transmission and distribution grid 18 and distributed ledger network 64 of FIG. 2. Residence 70 has a circuit panel 76 having a plurality of circuit breakers electrically coupled to grid 18 via an EMMB 78. EMMB 78 meters and controls the flow of electricity to and from circuit panel 76, which includes a plurality of EMCBs 80, 82, 84, an EVCB 86, and one or more traditional circuit breakers 87. EMMB 78, EMCBs 80-84, and EVCB 86 replace traditional circuit breakers in circuit panel 76 for select loads or renewable energy sources and are remotely controllable via a wireless connection.

EMCBs 80-82 meter and control the flow of electricity to high load devices 88, 90 at consumer and prosumer sites in distributed network 64. High load devices may be an electric dryer, an HVAC system, an electric water heater, or any other load that utilizes a relatively large amount of electricity. EMCB 84 meters and controls the flow of electricity from solar PV panels 92 and a battery storage system 94 that includes at least one battery. Battery storage system 94 may store energy produced by PV panels 92 for distribution to the loads of residence 70 at a later time. In some embodiments, battery storage system 94 may also store energy received from grid 18 for later distribution to loads of residence 70. As a non-limiting example, battery storage system 94 may store energy from grid 18 when the tariffs are low and use that energy to power high load devices 88, 90 when tariffs are high. EVCB 86 meters and controls the flow of electricity to electric vehicle 96 through an electric vehicle charger 97. In one non-limiting embodiment EMCBs 80, 82, 84 and EVCBs 86 are rated for 15-20 amps, and EMMB 78 is a 200-amp breaker.

Figure 4:
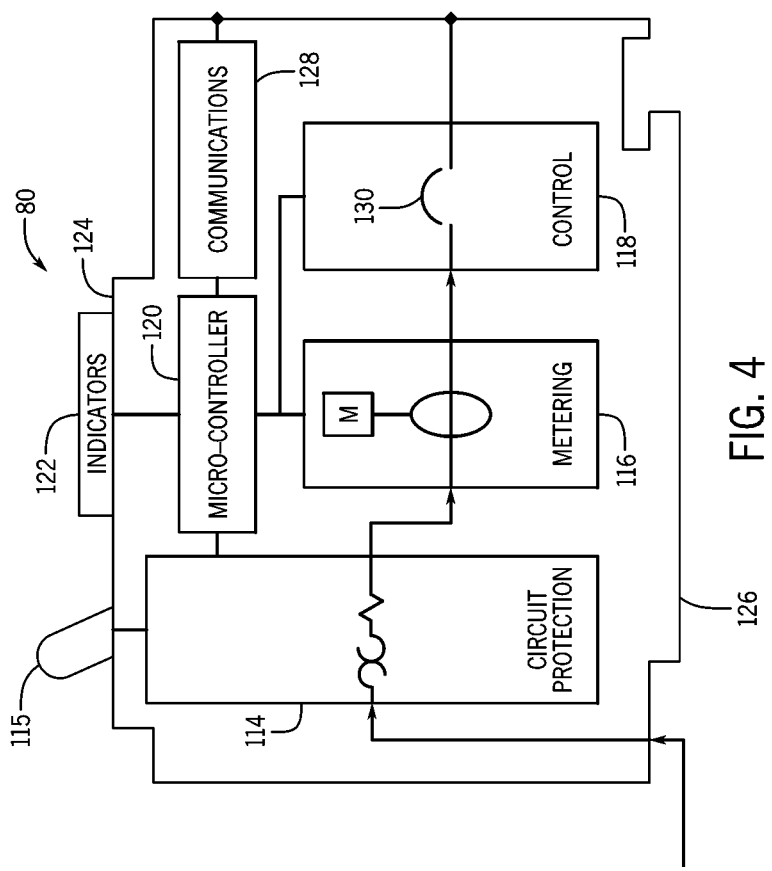
FIG. 4 is a schematic diagram of an exemplary embodiment of an energy management main breaker (EMMB) or energy management circuit breaker (EMCB) usable in the circuit panel of FIG. 3, according to an embodiment of the invention.

FIG. 4 is a schematic diagram of EMCB 80, according to an embodiment of the invention. While FIG. 4 is described as depicting EMCB 80, the description is equally applicable to EMCBs 82, 84 and EMMB 78 of FIG. 3. In a non-limiting embodiment, EMCB 80 is a 208/240V, 2-pole breaker. EMCB 80 includes a circuit protection component 114 that operates a trip mechanism 115, branch circuit metering component 116, and control components 118, which are connected to a processor, controller, or micro-controller 120. EMCB 80 may also include status indicators 122 located on an external surface 124 of a housing 126 and a communications module 128 located within housing 126, both of which are communicatively coupled to micro-controller 120. In one non-limiting embodiment, micro-controller 120 is programmed with the enhanced intelligence software referred to herein as a Smart Contract. In another non-limiting embodiment, micro-controller 120 contains the key or signature authority to approve the Smart Contract that resides in the cloud.

Circuit protection component 114 may be a traditional thermal-magnetic device with short circuit, overload, ground fault, and arc fault protection. Circuit protection component 114 may include additional protection features as needed for specific applications. Branch circuit metering component 116 may include remote utility grade net metering features that are accurate to within a small percentage (for example 2%) and provide time-stamped values. Control components 118 include a relay 130 that may be switched between an ON state that allows electricity to flow therethrough and an OFF state that prevents electricity from flowing therethrough. Relay 130 is independent from trip mechanism 115 and is controlled by micro-controller 120. Communications module 128 includes two-way wireless communications capabilities such that it may receive or transmit information. For example, communications module 128 may transmit information regarding the status of EMCB 80 or receive instructions for micro-controller 120 from distributed ledger network 64 of FIG. 3. Communications module 128 may include a battery backup for communication during a power outage. Status indicators 122 indicate the status of EMCB 80. In a non-limiting embodiment, status indicators 122 include a plurality of light indicators, such as, for example, LEDs, that indicate the status of trip mechanism 115 and relay 130.

Figure 5:
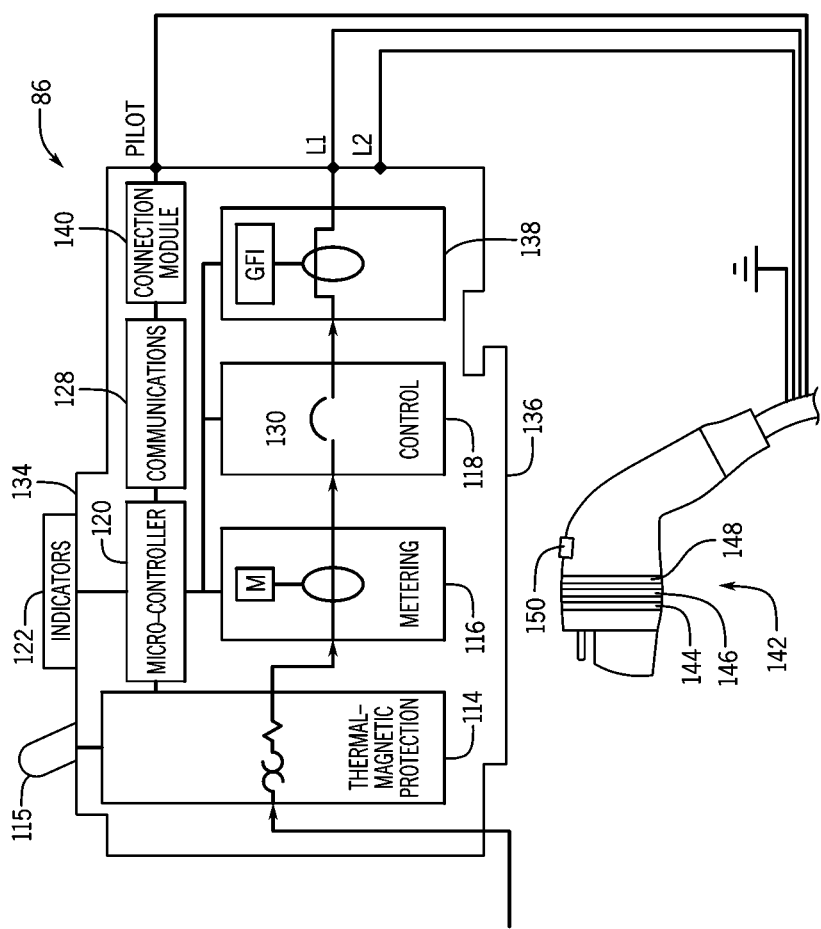
FIG. 5 is a schematic diagram of an exemplary embodiment of an electric vehicle circuit breaker (EVCB) usable in the circuit panel of FIG. 3, according to an embodiment of the invention.

FIG. 5 illustrates a schematic diagram of EVCB 86, according to one embodiment of the invention. EVCB 86 includes many of the same components with the same features as EMCB 80 including circuit protection component 114 operating trip mechanism 115, branch circuit metering component 116, control components 118 including relay 130, micro-controller 120, status indicators 122 located on an external surface 134 of a housing 136, and communications module 128. However, EVCB 86 also includes a ground fault interruption module 138 and an electric vehicle connection module 140. In a non-limiting embodiment, the electric vehicle connection module 140 follows the SAE J-1772 standard for connections to electric vehicles. Ground fault interruption module 138 and electric vehicle connection module 140 are coupled to an electric vehicle charger 142 for charging electric vehicle 96 of FIG. 3. Electric vehicle charger 142 includes a power available indicator 144, a charging indicator 146, and a fault indicator 148, and a reset/override button 150. In some embodiments, EVCB 86 further includes an enhanced electric vehicle connector with an embedded user interface (not shown). In a non-limiting embodiment, EVCB 86 is a 208/240V, 2-pole breaker.

Referring again to FIG. 3, with continued reference to FIGS. 4-5 as appropriate, communication modules 128 of EMMB 78, EMCBs 80-84, and EVCB 86 are in communication with distributed ledger network 64 via wireless connections 98 and with a wi-fi hub 100 at prosumager site 68 via wireless connections 102. Alternatively, EMMB 78, EMCBs 80-84, and EVCB 86 may be connected to distributed ledger network 64 through wi-fi hub 100 via wireless connections 102 and a wireless connection 104 between wi-fi hub 100 and distributed ledger network 64, rather than direct wireless connections 98. In some embodiments, some or all of wireless connections 98, 102, 104 may be replaced with wired connections. At least one wireless device 106, such as, for example, a tablet or smart phone, having a user interface 108 is also connected to wi-fi hub 100 via a wireless connection 110.

At least one distributed ledger node is established at prosumager site 68. If prosumager site 68 only includes one node, the distributed ledger node may be established at either EMMB 78, at wi-fi hub 100, or at another location configured to track each energy transaction at prosumager site 68. Alternatively, prosumager site 68 may include multiple distributed ledger nodes established at each EMCB 80-84 and at EVCB 86 such that EMCBs 80-84 and EVCB 86 have their own separate energy transactions associated therewith. Each distributed ledger node is part of distributed ledger network 64, and each distributed ledger node includes a Smart Contract. In a preferred embodiment, EMMB 78, EMCBs 80-84, and/or EVCB 86 are connected to the Smart Contracts that reside in the cloud. Alternatively, the Smart Contracts are provided within micro-controller 120 of EMMB 78, EMCBs 80-84, and/or EVCB 86. Alternatively, a Smart Contract may be provided as software programmed on the processor of a single device, such as, for example, wireless device 106 that is linked to EMMB 78, EMCBs 80-84, and/or EVCB 86.

In all of the embodiments, user interface 108 is configured to allow the electricity prosumer to actively or passively choose from available energy suppliers based on the prosumer's requirements or preferences, which may include an urgent/scheduled energy need, the tariffs associated with the energy, the reliability/resiliency of the supplier, and green or renewable energy content, as non-limiting examples. User interface 108 also allows the prosumer to set preferences for when to (A) store within battery storage system 94 energy produced by PV panels 92 or received from grid 18, (B) distribute energy produced by PV panels 92 and/or stored in battery storage system 94 to other loads in residence 70, or (C) sell the stored energy via a Smart Contract and transfer the stored energy to grid 18. The preferences for (A)-(C) may be based on an urgent/scheduled energy need and tariffs associated with the purchase and/or sale of the energy from/to grid 18, as non-limiting examples. Each of the preferences set by the prosumer may include a threshold for the purchase/sale of energy. As a non-limiting example, the prosumer may set a maximum tariff threshold for purchasing energy from energy suppliers and a minimum threshold for selling energy to energy consumers. The prosumer can modify any of the available preferences through user interface 108 at any time, but the prosumer may also elect to set preferences during an initial set-up period and maintain those preferences indefinitely. The user interface can include pre-programmed settings with priority on convenience (getting the power any time), lowest cost (keeping the electricity bill at a minimum), and/or maximize renewable energy usage.

As a non-limiting example of defining parameters for electricity consumption, the prosumer may utilize user interface 108 to set scheduling preferences for EMCBs 80-82 based on a number of factors including time-of-day, pricing, and green energy content. As described above, EMCBs 80-82 are coupled to high load devices 88, 90, and EVCB 86 is coupled to the high load device of electric vehicle charger 97. In general, the high load devices at a site consume a large portion of the energy flowing to that site. As a non-limiting example, the high load devices at prosumer site 68 may use approximately 70% of the total energy consumed at prosumer site 68. Thus, the prosumager at site 68 may wish to set a preference for EMCB 80 and EVCB 86 to supply electricity to their respective high load devices overnight to take advantage of lower electricity pricing. By setting scheduling preferences for electricity transfer to high load devices, a consumer or prosumer can have a significant impact on the electricity bill for the property. In one embodiment, the user-based control of EMMB 78, EMCBs 80-84, and EVCB 86 may be provided on a subscription basis.

The predetermined supply/demand preferences or parameters for matching the prosumer with an energy supplier or consumer may be stored in a cloud storage system 151 or, alternatively in a physical storage system associated with distributed ledger network 64 and/or may be stored on-site in at least one device connected to distributed ledger network 64 such as, for example, wireless device 106, EMMB 78, EMCBs 80-84, and EVCB 86. The predetermined parameters are used in a matching and scheduling algorithm architecturally separate from the Smart Contracts. The scheduling algorithm matches the prosumer with appropriate energy suppliers and consumers and generates a schedule for receiving energy from suppliers and selling energy to consumers based on the predetermined preferences set by the prosumer. In one embodiment, the scheduling algorithm is stored on the cloud storage system and is executed by a processor associated with the cloud storage system.

Energy producers and suppliers may actively or passively establish real time pricing, availability, and renewable content of their produced or stored energy on distributed ledger network 64 such that the scheduling algorithm can access and use the information to generate the energy schedule. When the energy scheduling algorithm has generated an energy schedule for prosumer site 68, the Smart Contract executes the energy/payment transactions. Each transaction is recorded in distributed ledger network 64, and each payment to be made or received by the prosumer may be held in an escrow account. Once an energy transaction is complete (the energy has been delivered), the payment for that transaction may be released from escrow, transferred to the appropriate party, and recorded on the distributed ledger network 64. Alternatively, multiple payments may be released from escrow for a single energy transaction such that payments are made at regular intervals. As a non-limiting example, payments may be released at specified time intervals (e.g., every five minutes, 12 hours, 7 days, etc.) or at specified energy delivery intervals (e.g., every 1 kW-hr delivered) until the transaction is complete.

Figure 6:
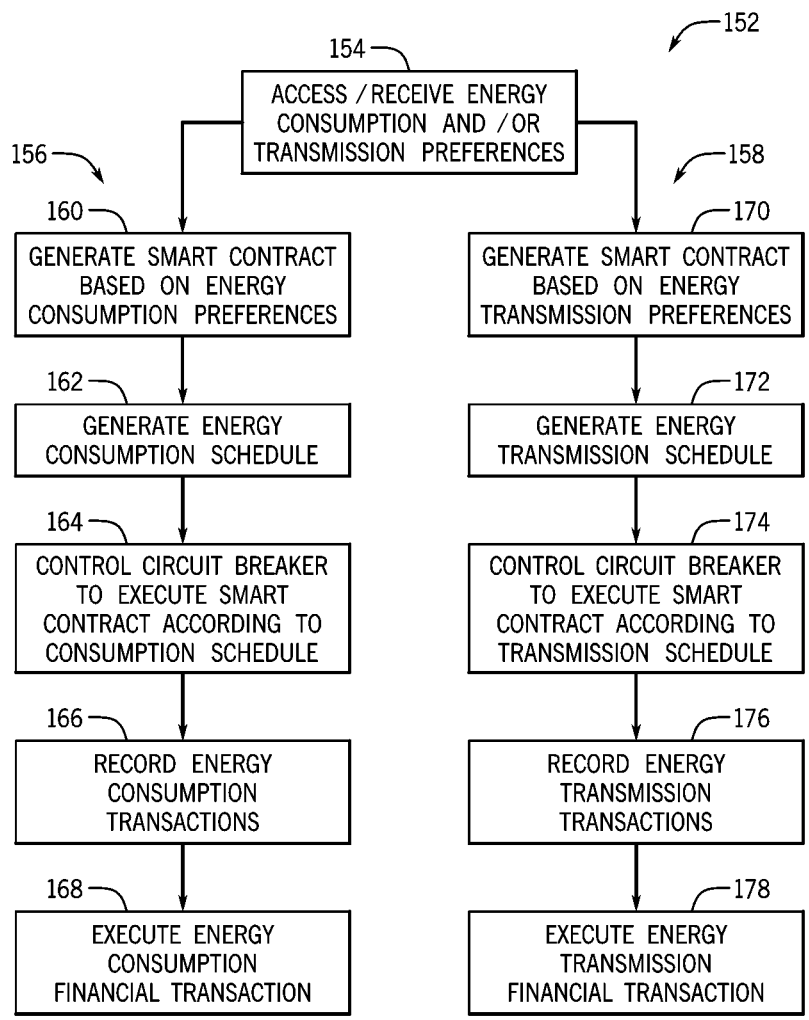
FIG. 6 is a flow chart setting forth exemplary steps of a process for managing the distribution of energy at the exemplary prosumer site of FIG. 3, according to an embodiment of the invention.

Referring now to FIG. 6 with reference to FIGS. 3-5, as appropriate, a process or technique 152 for managing the distribution of electricity at prosumer site 68 of FIG. 3 is shown, according to an embodiment of the invention. While process 152 is described below as operating at prosumer site 68 of FIG. 3, select portions of process 152 may operate at any consumer or prosumer site that is part of a distributed ledger network such as, for example, distributed ledger network 64 of FIG. 3. Process 152 may be performed by at least one non-transitory, computer readable storage medium located at prosumer site 68 such as, for example, on EMMB 78, EMCBs 80-84, EVCB 86, and/or wireless device 106. As a non-limiting example, process 152 may be performed by software on micro-controllers 120 of EMMB 78, EMCBs 80-84, EVCB 86, as shown in FIGS. 4-5, and/or on a controller (not shown) on wireless device 106 or in the cloud.

Initially, at STEP 154, process 152 accesses or receives energy consumption and/or transmission preferences from the prosumager at site 68. The prosumager may access user interface 108 to set preferences for the consumption of electricity by high load devices 88, 90, such as, for example, an electric dryer, HVAC system, and electric water heater, and electric vehicle charger 97. In some embodiments, process 152 may optionally prompt the prosumager to enter energy consumption and transmission preferences on user interface 108. As a non-limiting example, the prosumager may set a preference for EMCBs 80-82 and EVCB 86 to disable the use of high load devices 88, 90 and electric vehicle charger 97 during peak electricity pricing by setting a threshold price that the prosumager is willing to pay for electricity. In that case, the EMMB 78 and/or EMCBs 80-82 will restrict electricity flow to high load devices 88, 90 or electric vehicle charger 97 until the electricity price is below a pricing threshold set by the prosumager, even if high load devices 88, 90 and electric vehicle charger 97 are plugged into an appropriate outlet. The prosumager may also set a preference for purchasing renewable energy for powering high load devices 88, 90 and a threshold price that the prosumager is willing to pay for that renewable energy.

The prosumager may also access user interface 108 to set preferences for how to distribute electricity produced by PV panels 92 and energy stored in battery 94. As a non-limiting example, the prosumager may set a preference for storing the energy produced by PV panels 92 in battery storage 94 during the day and using or selling that energy during peak electricity pricing hours. As another non-limiting example, the prosumager may set a preference for transmitting energy from PV panels 92 and/or battery storage 94 to grid 18 during peak pricing hours by setting a threshold price for what the prosumager is willing to accept for the energy produced.

The prosumager may optionally set preferences for energy consumption from grid 18 through EMMB 78 as well. If the prosumager is capable of producing enough energy to run without power from grid 18, EMMB 78 may be controlled to disconnect residence 70 from grid 18. As a non-limiting example, the prosumager may set a preference to disconnect from grid 18 if PV panels 92 are producing an adequate amount of energy in combination with the energy stored in battery storage 94. In some embodiments, the prosumager site 68 may include an on-site backup generator (not shown) to enable the prosumager to disconnect from grid 18.

After accessing or receiving the energy consumption and transmission preferences at STEP 154, process 152 enters energy consumption sub-routine 156 and/or energy transmission sub-routine 158. Energy consumption sub-routine 156 includes STEPS 160-168 for managing the consumption of energy by any load with an EMCB or EVCB such as, for example, high load devices 88, 90 and electric vehicle charger 97. Energy transmission sub-routine 158 includes STEPS 170-178 for managing the transmission of energy from PV panels 92 and/or battery storage system 94 at prosumager site 68 to grid 18. Energy consumption sub-routine 156 and energy transmission sub-routine 158 are executed based on the respective energy consumption and transmission preferences set by the prosumager.

In the case of prosumager site 68, energy consumption sub-routine 156 and energy transmission sub-routine 158 are carried out as prosumager site 68 consumes energy (e.g., via high load devices 88, 90 and electric vehicle charger 97) and transmits energy to grid 18 (e.g., via PV panels 92 and battery storage system 94). At different sites, energy consumption sub-routine 156 or energy transmission sub-routine 158 may be optional. As a non-limiting example, if process 152 is performed at a consumer site that does not include any DERs, process 152 would only include energy consumption sub-routine 156.

With respect to energy consumption sub-routine 156 of process 152, the prosumager's energy consumption preferences are used to generate at least one Smart Contract that is stored either on device 106, on EMMB 78, EMCBs 80-84 and EVCB 86, or on all devices at STEP 160. Once a Smart Contract has been generated and stored, the prosumager may change or modify it at any time via user interface 108. At STEP 162, the scheduling algorithm described above with respect to FIG. 3 generates an energy consumption schedule according to the prosumager's energy consumption preferences. In other words, the scheduling algorithm matches prosumager site 68 with appropriate energy suppliers on grid 18 based on the energy consumption preferences and creates a time table for delivering energy from the energy suppliers to high load device 88, 90 and electric vehicle charger 97.

At STEP 164, process 152 executes the Smart Contract using micro-controllers 120 (FIGS. 4-5) on EMMB 78, EMCBs 80-82, and/or EVCB 86. Micro-controllers 120 control relays 130 of control components 118 in the ON and OFF states to selectively allow electricity to flow therethrough based on the energy consumption schedule generated by the scheduling algorithm. Branch circuit metering components 116 meters all energy flowing through EMMB 78, EMCBs 80-84, and EVCB 86 during execution of the Smart Contract. At STEP 166, micro-controller 120 records or stores the electricity or energy usage data metered by branch circuit metering components 116 as separate electron, energy, or electricity consumption transactions at prosumer site 68, on distributed ledger network 64, or in both locations.

At STEP 168, process 152 accesses the recorded electron consumption transactions and executes a financial transaction between the prosumager at site 68 and the energy supplier from which the prosumager received the energy. Execution of the financial transaction may include prompting the prosumager at site 68 to input financial information on user interface 108 for completing the financial transactions such as, for example, the account or accounts from which payment should be made. In some embodiments, the execution of the financial transactions may include holding the prosumager's payment (e.g., tokens, cryptocurrencies, etc.) in escrow while the energy is being delivered to site 68, and, once the energy supplier has met the energy delivery terms, the payment may be released from escrow and transferred the supplier. In any case, once the financial transaction has been executed, the execution of the Smart Contract is complete and the transaction is recorded on or registered with distributed ledger network 64.

Regarding energy transmission sub-routine 158 of process 152, the prosumager's energy transmission preferences are used to generate at least one Smart Contract that is stored either on device 106, on EMMB 78 and EMCB 84, or on all devices at STEP 170. The prosumager may change or modify the Smart Contract at any time via user interface 108. At STEP 172, the scheduling algorithm described above with respect to FIG. 3 generates an energy transmission schedule according to the prosumager's energy transmission preferences. In other words, the scheduling algorithm matches prosumager site 68 with appropriate energy consumers on grid 18 (e.g., a utility or residential, commercial, or industrial consumer) based on the energy transmission preferences and creates a time table for delivering energy from PV panels 92 and/or battery storage system 94 to the consumers.

At STEP 174, process 152 executes the Smart Contract using micro-controller 120 (FIG. 4) on EMCB 84. Micro-controller 120 controls relays 130 of control components 118 in the ON and OFF states to selectively allow electricity to flow therethrough based on the energy transmission schedule generated by the scheduling algorithm. While the Smart Contract is executed, branch circuit metering components 116 meters all energy flowing through EMMB 78 and/or EMCB 84 to record how much electricity has been transmitted to grid 18. At STEP 176, micro-controller 120 records or stores the electricity or energy transmission data metered by branch circuit metering components 116 as separate electron, energy, or electricity transmission transactions at prosumer site 68, on distributed ledger network 64, or in both locations.

At STEP 178, process 152 accesses the recorded electron transactions and executes a corresponding financial transaction between the prosumager at site 68 and the energy consumer to which the prosumager transmitted the energy. Prior to executing the financial transaction, the prosumager at site 68 may be prompted to input financial information on user interface 108 for completing the financial transactions such as, for example, the account or accounts to which payment should be made. Optionally, the execution of the financial transactions may include holding the energy consumers payment (tokens, cryptocurrencies, etc.) in escrow while the energy is being delivered from site 68 to the consumer's site, and, once the prosumager has met the energy delivery terms, the payment may be released from escrow and transferred the prosumager. Once the financial transaction has been executed, the execution of the Smart Contract is complete and the transaction is recorded on or registered with distributed ledger network 64.

In one embodiment, distributed ledger network 64, the Smart Contracts, and the matching/scheduling algorithm reside in the cloud and are connected to a home's energy management system (HEMS) or a building's energy management system (BEMS). A consumer can employ a user interface to set preferences while the HEMS and/or BEMS manages the individual loads in the home (HVAC, electric dryer, electric vehicle charger, etc.). As a non-limiting example, residence 70 of prosumer site 68 may (optionally) include an HEMS or BEMS 180, and a connection 182 may be made with wireless device 106 having user interface 108 and connected to wi-fi hub 100 via wireless connection 110. The prosumer at site 68 can use interface 108 to set preferences while HEMS 180 manages high energy loads 88, 90 and electric vehicle charger 97.

In one embodiment, access to the distributed ledger network 64 may be configured to allow the use of the electrical data metered by branch circuit metering components 116 during energy consumption sub-routine 156 of process 152 to facilitate electrical Power Genome (ePG). ePG is a methodology for developing diagnostic and prognostic solutions for electrical components. Distributed ledger network 64 will collect the data from branch circuit metering components 116 for each electrical load (e.g., electric dryer 88 and HVAC system 90) on its energy consumption rate with time. The data can be used to monitor, diagnose, and prognose (predictive diagnosis) the potential failures and remaining useful life of any electrical equipment. Access to distributed ledger network 64 data can enable a diagnostic program that analyzes the aggregated data and identifies any anomalous behavior or unusual energy consumption for the equipment, either of which can be an indicator of certain faults in the equipment. Access to distributed ledger network 64 data can also enable a prognostic program that analyzes aggregated data for particular patterns of energy consumption rate under normal circumstances/loading. These patterns can be analyzed to predict potential failure or remaining useful life of the equipment.

Beneficially, embodiments of the invention thus provide a decentralized peer-to-peer network that enables electricity consumers and prosumers to make electron transactions without a third-party intermediary. The peer-to-peer network operates using Smart Contracts stored on the network and the network nodes. The consumers and prosumers can enter preferences for electricity consumption and distribution based on various factors such as an urgent or scheduled need for electricity, cost of electricity, reliability/resiliency of an electricity supplier, and renewable energy content of electricity. The Smart Contracts are executed according to these preferences by at least one smart device at a network node such as, for example, a smart circuit breaker having a micro-controller. The smart device will selectively control when and how much electricity is consumed by a load or transmitted from a renewable energy source to a grid, meter that electricity, and transmit the metered electrical data to the peer-to-peer network. The peer-to-peer network then securely stores the metered electrical data as electron transactions and executes financial transactions between parties instead of a utility, thus decreasing the overhead involved in managing electrical transactions and lowering the overall cost of electricity. Accordingly, the peer-to-peer network facilitates electrical transactions between parties in a simple, secure, and streamlined manner.

Beneficially, the electricity distribution network disclosed herein provides consumers access to the electricity pricing market and permits consumers to define use schedules for their loads that have the highest draw of electricity based on the electricity pricing market. For example, a consumer is able to control exactly when to run their air conditioner based on how much they will pay under current market conditions. The electricity distribution network also provides consumers the ability to purchase electricity from renewable sources in addition to traditional utilities based on a number of predetermined parameters including price, urgency, and reliability, for example. The electricity distribution network further enables the owners/operators of DERs to sell excess renewable energy by establishing a marketplace in which the owners/operators can define pricing and other terms of sale and carry out electron and financial transactions with consumers in a secure and efficient manner.

One skilled in the art will appreciate that embodiments of the invention may be interfaced to and controlled by a computer readable storage medium having stored thereon a computer program. The computer readable storage medium includes a plurality of components such as one or more of electronic components, hardware components, and/or computer software components. These components may include one or more computer readable storage media that generally store instructions such as software, firmware and/or assembly language for performing one or more portions of one or more implementations or embodiments of a sequence. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of non-transitory and/or tangible computer readable storage media not listed may be employed with embodiments of the invention.

A number of such components can be combined or divided in an implementation of a system. Further, such components may include a set and/or series of computer instructions written in or implemented with any of a number of programming languages, as will be appreciated by those skilled in the art. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

According to one embodiment of the present invention, an electricity distribution system includes a peer-to-peer decentralized ledger network and a plurality of distributed ledger nodes in communication within the peer-to-peer decentralized ledger network. At least one distributed ledger node of the plurality of distributed ledger nodes includes a processor. The processor is programmed to schedule at least one of supply of electricity from one of a plurality of available energy sources to an on-site load based on predetermined demand parameters and delivery of electricity generated by a distributed energy resource (DER) to an external load based on predetermined supply parameters.

According to another embodiment of the present invention, a non-transitory, computer readable storage medium has stored thereon a computer program for managing the distribution of electricity. The computer program includes instructions that cause a processor to negotiate and execute at least one Smart Contract based on preferences for at least one of electricity consumption and electricity transmission for at least one distributed ledger node of a distributed ledger network and generate at least one of an electricity consumption schedule and an electricity transmission schedule for the at least one distributed ledger node according to the preferences. The instructions further cause the processor to instruct a device associated with at least one distributed ledger node to permit electricity to flow therethrough according to the generated schedule and register each electricity consumption and transmission transaction associated with the at least one distributed ledger node on the distributed ledger network.

According to yet another embodiment of the present invention, a non-transitory, computer readable storage medium has stored thereon a computer program for controlling energy distribution. The computer program includes instructions that cause a controller to access a Smart Contract including a number of predefined preferences for at least one of energy consumption and energy transmission through a node in a peer-to-peer network. The instructions also cause the controller to execute the Smart Contract by controlling a relay on a circuit breaker to selectively switch between an ON state that permits energy to flow therethrough and an OFF state that prevents energy from flowing therethrough and record each energy transaction executed at the node according to the Smart Contract with a distributed ledger on the peer-to-peer network.

According to still another embodiment of the present invention, an energy distribution system includes a peer-to-peer distributed ledger network and a plurality of distributed ledger nodes in communication with the peer-to-peer distributed ledger network. A first distributed ledger node of the plurality of distributed ledger nodes includes a distributed energy resource (DER); a smart meter monitoring an amount of energy produced by the DER; and a processor programmed to issue at least one certificate to an owner of the DER based on the monitored amount of renewable energy produced by the DER.

According to yet another embodiment of the present invention, a non-transitory, computer readable storage medium has stored thereon a computer program for controlling energy distribution. The computer program includes instructions that cause a controller to access a Smart Contract including a number of predefined preferences for at least one of energy consumption and energy transmission through a node in a peer-to-peer network. In addition, the instructions cause the controller to execute the Smart Contract to selectively permit or prevent a transfer of energy and record each energy transaction executed at the node according to the Smart Contract with a distributed ledger on the peer-to-peer network.

The present invention has been described in terms of the preferred embodiment, and it is recognized that equivalents, alternatives, and modifications, aside from those expressly stated, are possible and within the scope of the appending claims.

What is claimed is:

1. An electricity distribution system comprising:
a peer-to-peer decentralized ledger network; and
a plurality of distributed ledger nodes in communication within the peer-to-peer decentralized ledger network, wherein at least one distributed ledger node of the plurality of distributed ledger nodes comprises a processor programmed to:
select one of a plurality of available energy sources based on predetermined demand preferences associated with an energy buyer; and
schedule supply of electricity from the one of a plurality of available energy sources to an external load, the external load comprising an on-site load, an off-site load, or an on-site load and an off-site load, based on the predetermined demand preferences, wherein
the peer-to-peer decentralized ledger network is configured to permit execution of energy transactions only when there is at least one of a match of the predetermined demand preferences to information associated with the one of the plurality of available energy sources and a match of the predetermined supply preferences associated with an energy supplier to information associated with the external load.

2. The electricity distribution system of claim 1 wherein the at least one distributed ledger node further comprises a local network in communication with the peer-to-peer network.

3. The electricity distribution system of claim 1 wherein the at least one distributed ledger node further comprises a user interface that is configured to allow an electricity consumer to enter the predetermined demand preferences.

4. The electricity distribution system of claim 1 wherein the at least one distributed ledger node further comprises a user interface that is configured to allow the energy supplier to provide the predetermined supply preferences, and the predetermined supply preferences comprise at least one of real time pricing, availability, and a renewable energy content of energy produced or stored by the energy supplier.

5. The electricity distribution system of claim 1 wherein the peer-to-peer network comprises a decentralized and distributed ledger network.

6. The electricity distribution system of claim 1 wherein the predetermined demand preferences comprise at least one of an urgent or scheduled energy need, an energy tariff, a reliability or resiliency of an energy supplier, and a renewable energy content.

7. The electricity distribution system of claim 1 wherein the schedule comprises temporal schedule, the at least one distributed ledger node of the plurality of distributed ledger nodes comprises at least one circuit breaker positioned within a circuit breaker panel, and the at least one circuit breaker is controlled according to the temporal schedule.

8. The electricity distribution system of claim 7 wherein the at least one distributed ledger node further comprises a building energy management system (BEMS) that includes the processor and manages at least one load coupled to the circuit breaker panel.

9. The electricity distribution system of claim 7 wherein the at least one circuit breaker is configured for remote control.

10. The electricity distribution system of claim 1 wherein the processor is further configured to schedule delivery of electricity generated by a distributed energy resource (DER) to an external load based on the predetermined supply preferences.

11. A non-transitory, computer readable storage medium having stored thereon a computer program for managing the distribution of electricity, the computer program comprising instructions that cause a processor to:
negotiate and execute at least one Smart Contract based on preferences for at least one of electricity consumption and electricity transmission for at least one distributed ledger node of a distributed ledger network;
generate an electricity schedule, the electricity schedule comprising at least one of an electricity consumption schedule and an electricity transmission schedule for the at least one distributed ledger node according to the preferences;
execute the Smart Contract by instructing a circuit breaker associated with at least one distributed ledger node according to the generated electricity schedule, the instructing comprising controlling a relay on the circuit breaker to be in an ON state that permits energy flow during a time period included in the electricity consumption schedule or the electricity transmission schedule and in an OFF state that prevents energy flow during a time period not included in the electricity consumption schedule or the electricity transmission schedule; and
register each electricity consumption and transmission transaction associated with the at least one distributed ledger node on the distributed ledger network.

12. The non-transitory, computer readable storage medium of claim 11 wherein the instructions cause the processor to monitor electricity consumption data for at least one load.

13. The non-transitory, computer readable storage medium of claim 11 wherein the instructions cause the processor to prompt a consumer to enter the preferences for electricity consumption by at least one load on a user interface.

14. The non-transitory, computer readable storage medium of claim 11 wherein the instructions cause the processor to monitor an electricity pricing market to determine optimal time periods for connecting the at least one distributed ledger node to an electricity transmission and distribution grid based on preferences for electricity pricing.

15. The non-transitory, computer readable storage medium of claim 11 wherein the instructions cause the processor to monitor an electricity availability market to determine the availability of electricity produced by at least one type of distributed energy resource (DER) based on preferences for renewable energy.

16. A non-transitory, computer readable storage medium having stored thereon a computer program for controlling energy distribution, the computer program comprising instructions that cause a controller to:
access a Smart Contract including preferences for at least one of energy consumption and energy transmission through a node in a peer-to-peer network;
execute the Smart Contract by controlling a relay on a circuit breaker to be in an ON state that permits energy to flow therethrough to execute an energy transaction when there is a matching condition and to be in an OFF state that prevents energy from flowing therethrough when there is no matching condition, wherein the matching condition is one or more of: (i) an alignment between a preference for energy consumption and information about an energy source, and (ii) an alignment between a preference for energy transmission and information about a load; and
record each energy transaction executed at the node according to the Smart Contract with a distributed ledger on the peer-to-peer network.

17. The non-transitory, computer readable storage medium of claim 16 wherein the Smart Contract initiates a financial transaction between an energy buyer and an energy seller for each energy transaction.

18. The non-transitory, computer readable storage medium of claim 16 wherein the instructions cause the controller to query the peer-to-peer network for information regarding an electricity pricing network.

19. The non-transitory, computer readable storage medium of claim 16 wherein the instructions cause the controller to execute the Smart Contract to supply energy to a high load device when the price of electricity is lower than a threshold in the preferences.

20. The non-transitory, computer readable storage medium of claim 16 wherein the instructions cause the controller to:
query the peer-to-peer network to locate energy from a distributed energy resource (DER) for sale;
purchase the energy; and
supply the energy to a load.

21. The non-transitory, computer readable storage medium of claim 16 wherein the instructions cause the controller to supply energy to a grid from a distributed energy resource (DER) at the node when the price of electricity is greater than a threshold in the preferences.

22. The non-transitory, computer readable storage medium of claim 16 wherein the instructions cause the controller to query the peer-to-peer network to establish that a financial transaction has been completed for each energy transaction executed at the node.

23. An energy distribution system comprising:
a peer-to-peer distributed ledger network;
a plurality of distributed ledger nodes in communication with the peer-to-peer distributed ledger network, wherein a first distributed ledger node of the plurality of distributed ledger nodes comprises:
a distributed energy resource (DER);

a smart meter monitoring an amount of energy produced by the DER; and a processor programmed to: schedule transfer of energy to a load in a second distributed ledger node based on alignment between at least one preference of an energy consumer and information associated with the DER; and issue at least one certificate to an owner of the DER based on the monitored amount of renewable energy produced by the DER.

24. The energy distribution system of claim 23 wherein the processor is further programmed to:

transfer at least one certificate to an owner of the load after energy is transferred to the load, the at least one certificate indicating the amount of energy transferred.

25. The energy distribution system of claim 23 wherein the smart meter is located within a circuit breaker coupled to the DER.

26. The energy distribution system of claim 25 wherein the circuit breaker comprises two-way wireless communications capabilities and a relay operated by a controller in an ON state and an OFF state to selectively allow energy produced by the DER to flow therethrough.

27. The energy distribution system of claim 23 wherein the processor is programmed to issue one certificate on at least one of a kilowatt-hour basis and a megawatt-hour basis.

28. The energy distribution system of claim 23 wherein the processor is programmed to issue a fraction of a certificate on at least a fraction of a one kilowatt-hour basis.

29. A non-transitory, computer readable storage medium having stored thereon a computer program for controlling energy distribution, the computer program comprising instructions that cause a controller to:

access a Smart Contract including preferences for at least one of energy consumption and energy transmission through a node in a peer-to-peer network;

execute the Smart Contract by controlling a device to permit an energy transaction when there is a matching condition and prevent a transfer of energy when there is no matching condition, wherein a matching condition comprises one or more of (i) an alignment between preferences for energy consumption and information related to an energy source and (ii) an alignment between preferences for energy transmission and information related to a load; and record each energy transaction executed at the node according to the Smart Contract with a distributed ledger on the peer-to-peer network.

30. The non-transitory, computer readable storage medium of claim 29 wherein the Smart Contract initiates a financial transaction between an energy buyer and an energy seller.

31. The non-transitory, computer readable storage medium of claim 29 wherein the instructions cause the controller to query the peer-to-peer network for information regarding an electricity pricing network.

32. The non-transitory, computer readable storage medium of claim 29 wherein the instructions cause the controller to execute the Smart Contract to supply energy to a high load device when the price of electricity is lower than a threshold in the predefined preferences.

33. The non-transitory, computer readable storage medium of claim 29 wherein the instructions cause the controller to:

query the peer-to-peer network to locate energy from a distributed energy resource (DER) for sale;

purchase the energy; and supply the energy to a load.

34. The non-transitory, computer readable storage medium of claim 29 wherein the instructions cause the controller to supply energy to a grid from a distributed energy resource (DER) at the node when the price of electricity is greater than a threshold in the predefined preferences.

35. The non-transitory, computer readable storage medium of claim 29 wherein the instructions cause the controller to query the peer-to-peer network to establish that a financial transaction has been completed for each energy transaction executed at the node.

36. A method of distributing electricity comprising:

accessing a Smart Contract including preferences for energy consumption, energy transmission, or a combination thereof through a node in a peer-to-peer network;

executing the Smart Contract according to the predefined preferences by controlling a device associated with the node to allow electricity to flow therethrough and an energy transaction to occur only when there is a match between one or more of: (i) at least one preference for energy consumption and information about an energy source, and (ii) at least one preference for energy transmission and information about a load; and recording each energy transaction executed at the node according to the Smart Contract with a distributed ledger on the peer-to-peer network.

37. The method of claim 36 wherein executing the Smart Contract comprises controlling a relay of a circuit breaker to switch to an ON state.

38. The method of claim 36 further comprising querying the peer-to-peer network to locate energy from a distributed energy resource (DER) according to the predefined preferences.

39. The method of claim 36 further comprising:

monitoring an electricity pricing network; and executing the Smart Contract if electricity pricing is lower than an electricity pricing threshold in the predefined preferences.

40. The method of claim 36 further comprising generating an electricity consumption schedule, an electricity transmission schedule, or both for the node based on the predefined preferences; and executing the Smart Contract based on at least one generated schedule.

* * * * *